(12) United States Patent
Shao

(10) Patent No.: US 9,760,661 B2
(45) Date of Patent: Sep. 12, 2017

(54) PROVIDING VIRTUAL OPTICAL DISK DRIVE

(75) Inventor: Hua Shao, Shanghai (CN)

(73) Assignee: Hewlett-Packard Development Company, L.P., Houston, TX (US)

(*) Notice: Subject to any disclaimer, the term of this patent is extended or adjusted under 35 U.S.C. 154(b) by 608 days.

(21) Appl. No.: 14/372,110

(22) PCT Filed: Apr. 26, 2012

(86) PCT No.: PCT/CN2012/074774
§ 371 (c)(1),
(2), (4) Date: Jul. 14, 2014

(87) PCT Pub. No.: WO2013/159315
PCT Pub. Date: Oct. 31, 2013

(65) Prior Publication Data
US 2014/0343917 A1    Nov. 20, 2014

(51) Int. Cl.
| G06F 9/44 | (2006.01) |
| G06F 17/50 | (2006.01) |
| G06F 13/10 | (2006.01) |
| G06F 13/20 | (2006.01) |
| G06F 3/06 | (2006.01) |

(52) U.S. Cl.
CPC ........ *G06F 17/5009* (2013.01); *G06F 13/102* (2013.01); *G06F 13/105* (2013.01); *G06F 13/20* (2013.01); *G06F 3/0664* (2013.01); *G06F 2213/0024* (2013.01); *G06F 2213/0058* (2013.01)

(58) Field of Classification Search
None
See application file for complete search history.

(56) References Cited

U.S. PATENT DOCUMENTS

| 7,281,124 B2 | 10/2007 | Rothman et al. |
| 7,583,457 B2 | 9/2009 | Miller et al. |
| 7,937,575 B2 | 5/2011 | Hajji et al. |
| 2004/0236564 A1* | 11/2004 | Oshins ............. G01B 31/31835 703/25 |
| 2005/0039180 A1* | 2/2005 | Fultheim ............. G06F 9/45533 718/1 |
| 2008/0244127 A1 | 10/2008 | Huang |
| 2009/0293071 A1 | 11/2009 | Huang |
| 2010/0262722 A1* | 10/2010 | Vauthier ................... G06F 3/14 710/8 |
| 2011/0197055 A1 | 8/2011 | Spottswood et al. |
| 2011/0265083 A1* | 10/2011 | Davis .................. G06F 12/0866 718/1 |

OTHER PUBLICATIONS

Oestergaard et al., The Software—RAID HowTo, Jun. 3, 2004, unthought.ent.*
A Bootable Virtual Drive!, Jan. 11, 2009, http://www.ultimatebooted.com/forums/viewtopic.php?t=1739.
International Search Report and Written Opinion received in related PCT Application No. PCT/CN2012/074774, dated Feb. 7, 2013, 6 pages.

* cited by examiner

*Primary Examiner* — Craig Dorais
(74) *Attorney, Agent, or Firm* — HP Patent Department

(57) ABSTRACT

A method for providing a virtual optical disk drive (ODD) is provided. The method can comprise: simulating a PCI IDE controller through PCI configuration space IO trap and simulating the ODD through IDE device IO trap.

18 Claims, 4 Drawing Sheets

PROVIDING VIRTUAL OPTICAL DISK DRIVE

CROSS-REFERENCE TO RELATED APPLICATION

This application is a national stage application under 35 U.S.C. §371 of PCT/CN2012/074774, filed Apr. 26, 2012.

BACKGROUND

Many computers including desktop and laptop computers available in the market do not have internal optical disk drive. A user can buy an external optical disk drive if he wants to for example install software including the operating system from an optical disk or play video and audio contents in an optical disk. However, this would incur extra cost to the user.

BRIEF DESCRIPTION OF THE DRAWINGS

The accompanying drawings illustrate various examples of various aspects of the present disclosure. It will be appreciated that the illustrated element boundaries (e.g., boxes, groups of boxes, or other shapes) in the figures represent one example of the boundaries. It will be appreciated that in some examples one element may be designed as multiple elements or that multiple elements may be designed as one element. In some examples, an element shown as an internal component of another element may be implemented as an external component and vice versa.

DETAILED DESCRIPTION

There is also some virtual optical disk drive software that is available to users. This kind of virtual optical disk drive can use a mirror file to simulate the operation of a physical optical disk drive under the operating system and has some advantages, such as not needing an optical disk when running, fast processing capability, etc. However, this kind of virtual optical disk driver also has a shortcoming that it can only run under the operating system environment and it cannot be used to access a virtual optical disk during boot time. Active Management Technology of Intel provides a remote IDE (Integrated Drive Electronics) redirection feature, but it needs specific chipset to support.

FIG. 1 through 7 discussed below and the various examples presented in this disclosure are by way of illustration only and should be not construed in any way to limit the scope of the invention. Those skilled in the art will understand that the principles presented herein may be implemented in any suitably arranged processing system.

Figure 1:
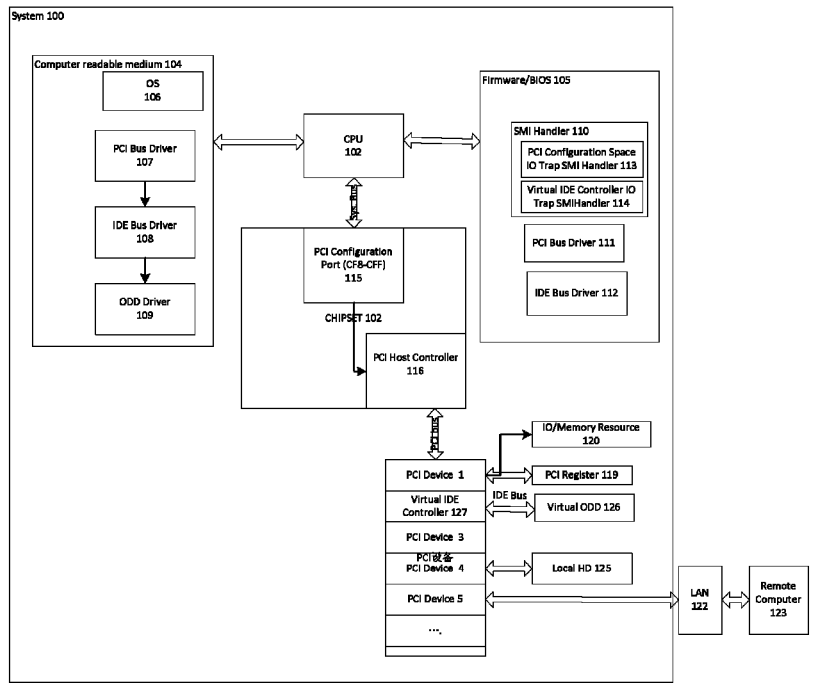
FIG. 1 illustrates a schematic view of a system according to an example of the present disclosure.

With reference to FIG. 1, FIG. 1 illustrates a block diagram of a computer system 100 according to an example of the present invention. As shown in FIG. 1, the system 100 includes a CPU 102 and a computer readable medium 104 and firmware/BIOS 105 connected to the CPU through a system bus. The computer readable medium 104 can include random access memory (RAM), or non-volatile memory, e.g. any one or more of a read-only memory (ROM), EPROM, EEPROM, etc. An operating system 106 can reside in the computer readable medium 104. The operating system 106 can be a Windows® system, a Linux® system or other kind of operating system. Under the operating system 106 there are various application and drivers, such as a PCI (Peripheral Component Interconnect) bus driver 107, an IDE bus driver 108, an optical disk drive driver 109 shown in FIG. 1. There are also some drivers residing in the firmware/BIOS 105, such as an SMI (System Management Interrupt) handler 110, a PCI bus driver 111 and an IDE bus driver as shown in FIG. 1. It can be understood that, although not shown, there can be many other application programs in the operating system 106 and the firmware/BIOS 105.

The system 100 also includes a chipset 102, which comprises a PCI host controller 116. The PCI host controller 116 controls many PCI devices 1-5 connected to a PCI bus 117. For example, the PCI device can be a network adapter, through which the system 100 connected to a network such as a LAN so as to communicate with a remote computer 123 via the network. For example, one of the PCI device can be a local hard disk 121 used in the system 100. Another PCI device shown in FIG. 1 is a virtual PCI IDE controller 127, which is connected through an IDE bus to a virtual optical disk drive 126. Implementation of the virtual PCI IDE controller 127 and the virtual optical disk drive 126 according to an example of the present disclosure is described in detail below.

Each PCI device has three spaces: memory space, input/output (I/O) address space and configuration space. As shown in FIG. 1, each PCI device has a PCI register 119 (only one is shown) and IO resource 120. The configuration space may be 256 bytes that are addressable by knowing the 8-bit PCI bus, 5-bit device, and 3-bit function numbers for the device (commonly referred to as the BDF bus/device/function). That is to say, a PCI device is addressed via Bus, Device, and Function. The PCI configuration header allows the system to identify and control the PCI device. The location of the PCI configuration header in the PCI configuration space depends on the location of the PCI device on the PCI bus. Configuration space is a physical address unique to the PCI bus. The configuration registers of each PCI device are accessed through PCI interface. The PCI interface uses two IO locations at addresses 0CF8 and 0CFC. The 0CF8 address references the Configuration Address register, which is 0CF8-0CFB. The 0CFC address references the Configuration Data register, which is 0CFC-0CFF. These two registers are shown as PCI configuration port 115 in FIG. 1. To access PCI configuration space, a data value is written to the Configuration Address register that specifies the PCI bus, the PCI device on that bus, the function number of the PCI device, and the configuration register in the PCI device that is being accessed. A subsequent read or write to the Configuration Data register causes the PCI bridge to translate the data value in the Configuration Address register in order to access the configuration register and the configuration memory for the PCI device.

As shown in FIG. 1, the SMI hander 110 includes a PCI configuration space IO trap SMI handler 113 and a Virtual IDE Controller IO Trap SMI handier 114, wherein the PCI configuration space IO trap SMI handler 113 runs to handle a SMI caused by a PCI configuration space IO trap and the Virtual IDE Controller IO Trap SMI handier 114 runs to handle a SMI caused by a Virtual IDE Controller IO Trap, as described in detail in the following.

Figure 2:
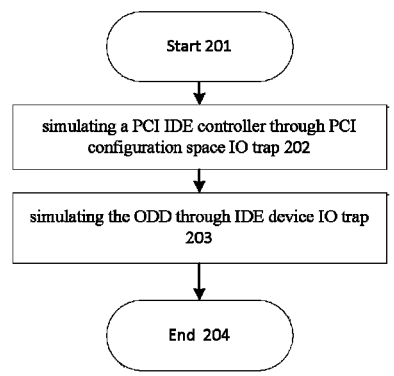
FIG. 2 illustrates a flow chart of a method for providing a virtual optical disk drive according to an example of the present disclosure.

With reference to FIG. 2, FIG. 2 illustrates a flow chart of a method for providing a virtual optical disk drive in a computer system according to an example of the present disclosure. The method of FIG. 2 can be implemented during boot time of the computer system or under the operating system. By using the chipset IO trap feature, the system firmware can trap the IO space and control the read/write value for the port from the SMM (System Management Mode) code to do hardware simulation. At block 202, a PCI IDE controller is simulated through PCI configuration space IO trap. Then at block 203, an ODD is simulated through IDE device IO trap.

Figure 3:
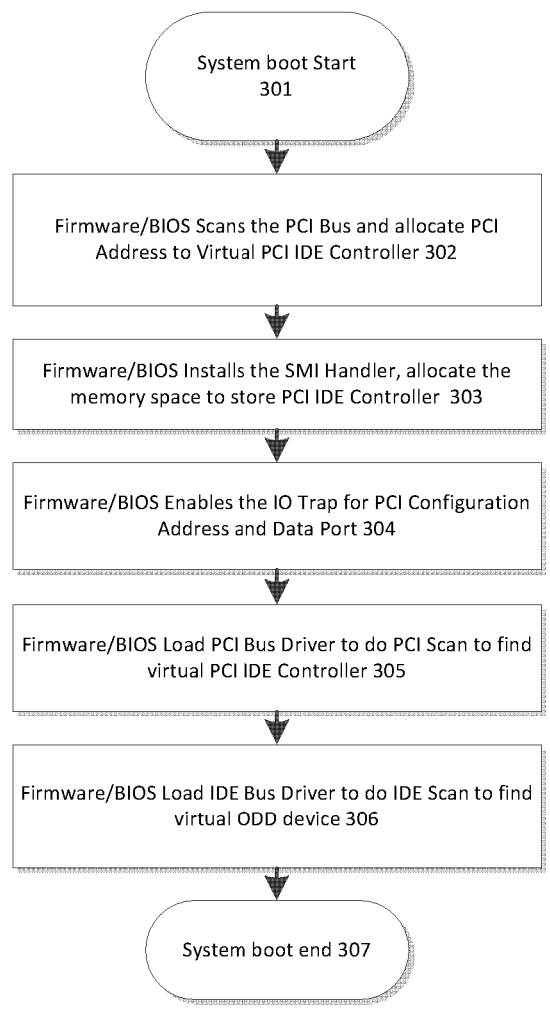
FIG. 3 illustrates a flow chart of a method for providing a virtual optical disk drive during boot time of a computer system according to an example of the present disclosure.

With reference to FIG. 3, FIG. 3 illustrates a flow chart of a method for providing a virtual optical disk drive during a boot time of a computer system according to an example of the present disclosure. In FIG. 3, blocks 302-305 is an implementation example of block 202 of FIG. 2 and block 306 is an implementation example of block 203 of FIG. 2. At block 301, the system is powered on and starts the boot process. At block 302, the firmware/BIOS scans the PCI bus and allocates a PCI address (Bus, Device, Function) to a virtual PCI IDE controller. At block 303, the firmware/BIOS installs an SMI handler, and allocates the memory space to store the virtual PCI IDE controller. At block 304, the firmware/BIOS enables the IO trap for PCI Configuration Address and Data Port (0CF8-0CFF). At block 305, the firmware/BIOS loads a PCI bus driver to perform PCI scanning. The PCI bus driver will find the virtual PCI IDE controller in a way that is described in detail with reference to FIG. 4 in the following. Then at block 306, the firmware/BIOS loads an IDE bus driver to perform IDE scanning. The IDE bus driver will find a virtual ODD device in a way that is described in detail with reference to FIG. 5. At block 307, the system boot process ends.

Figure 4:
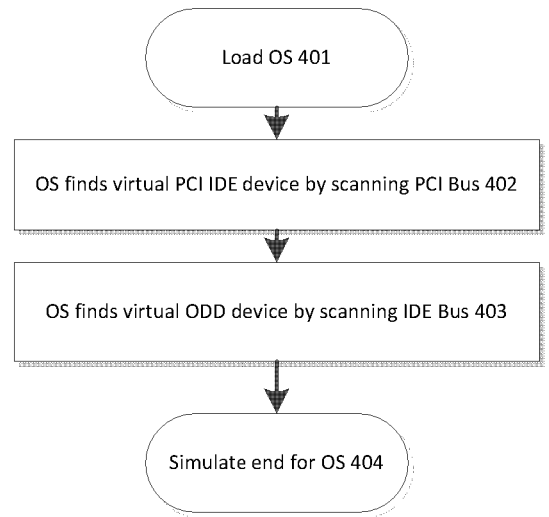
FIG. 4 illustrates a flow chart of a method for providing a virtual optical disk drive under the operating system according to an example of the present disclosure.

With reference to FIG. 4, FIG. 4 illustrates a flow chart of a method for providing a virtual optical disk drive after a computer system is booted (i.e. under the operating system) according to an example of the present disclosure. The method of FIG. 4 starts by loading of the operating system, as shown in block 401. At block 402, the operating system finds a virtual PCI IDE device (i.e. a virtual PCI IDE controller) by scanning the PCI bus. The specific implementation of block 402 is shown in FIG. 4. Then, at block 403, the operating system finds a virtual ODD device by scanning the IDE bus. The specific implementation of block 403 is shown in FIG. 4. The simulation ends at block 404.

Figure 5:
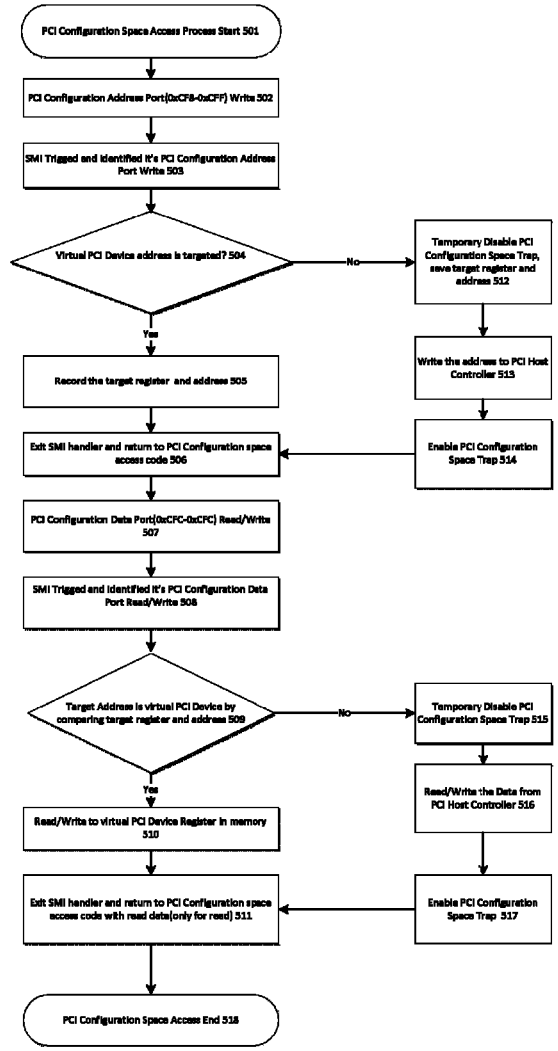
FIG. 5 illustrates a flow chart of a method for PCI configuration space access process that can be used in an example of the present disclosure.

With reference to FIG. 5, FIG. 5 illustrates a flow chart of a method for PCI configuration space access process that can be used in an example of the present disclosure. The method starts at block 501, where the PCI configuration space access process starts. At 502, the PCI bus driver writes a data value to the PCI Configuration Address Port (0CF8-0CFB). At 503, the write in 502 triggers a System Management Interrupt (SMI) and the SMI interrupt handler runs to handles the PCI configuration space access, wherein it is identified that this write is a PCI Configuration Address Port write. At block 504, it is determined whether this write operation is targeted to a virtual PCI device address. If no, it indicates that the PCI bus driver is accessing another physical PCI device instead of a virtual PCI device and the control should be passed to a PCI host controller. In this case, the method proceeds to block 512, where the PCI configuration space trap is temporarily disabled and the target register and address are saved. From block 512, the method proceeds to block 513, where the saved address is written to the PCI host controller. At block 514, the PCI configuration space trap is enabled again.

If, on the other hand, it is determined that the virtual PCI device address is targeted, which indicates that the PCI bus driver is accessing a virtual PCI device, the method proceeds to block 505, where the target register and address are recorded. Then, the process exits the SMI handler and returns to PCI configuration space access code, as shown by block 506. Next, at block 507, the PCI bus driver initiates read/write operation to the PCI Configuration Data Port (0CFC-0CFF). This also triggers an SMI and it is identified that this is a PCI Configuration Data Port read/write, as shown by block 508. Then it is determined again whether the target address is a virtual PCI device by comparing the target register and the address. If no, it indicates that the PCI bus driver is accessing another physical PCI device instead of a virtual PCI device and the control should be passed to a PCI host controller. In this case, the method proceeds to block 515, where the PCI configuration space trap is temporarily disabled. From block 515, the method proceeds to block 516, where data is read/written from/to the PCI host controller. Then at block 517, after the data operation is finished, the PCI Configuration Space trap is enabled again.

If, on the other hand, it is determined that the virtual PCI device address is targeted, which indicates that the PCI bus driver is accessing a virtual PCI device, the method proceeds to block 510, where data is read/written from/to a virtual PCI device register in the memory. Then at block 511, the process exits the SMI handler and returns to the PCI configuration space access code, with read data (in case of read operation). At block 518, the PCI configuration space access process ends.

Figure 6:
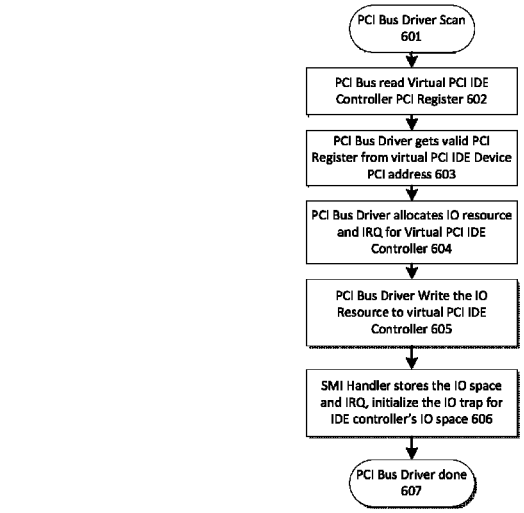
FIG. 6 illustrates a flow chart of a method for virtualizing an optical disk drive controller according to an example of the present disclosure.

With reference to FIG. 6, FIG. 6 illustrates a flow chart of a method for virtualizing an optical disk drive controller according to an example of the present disclosure. This method starts at block 601, where the PCI bus driver scans a PCI device on the PCI bus. Please be noted that the PCI bus driver could reside in the system firmware or under the operating system (OS), that is, the method of FIG. 6 can be implemented both during boot time and under OS. Please also be noted that in this example, the optical disk driver controller is for instance a PCI IDE controller but those skilled in the art will understand that this method also applies to a SATA optical disk drive controller. At block 602, the PCI bus driver reads the PCI register of the virtual PCI IDE controller. The operation in this block 602 is specifically carried out by the process shown in FIG. 5. At block 603, the PCI bus driver determines that it gets a valid PCI register from the virtual PCI IDE device PCI address. Then at block 604, the PCI bus driver allocates IO resource and interrupt request (IRQ) to the virtual PCI IDE controller. At block 605, the PCI bus driver writes the allocated IO resource to the virtual PCI IDE controller. Please be noted that the operation in this block 605 is specifically carried out by the process shown in FIG. 5. The method proceeds then to block 606, where the SMI handler (i.e. the virtual IDE controller IO trap SMI handler in FIG. 1) stores the allocated IO resource and IRQ and sets up or initializes the IO trap for the IDE controller's IO space. At block 607, the method ends. Please be noted that the operations in block 604-606 are carried out only under firmware/BIOS. Through the process in FIG. 6, the system can trap the IDE IO so a virtual PCI IDE controller (i.e. the optical disk drive controller) is implemented.

Figure 7:
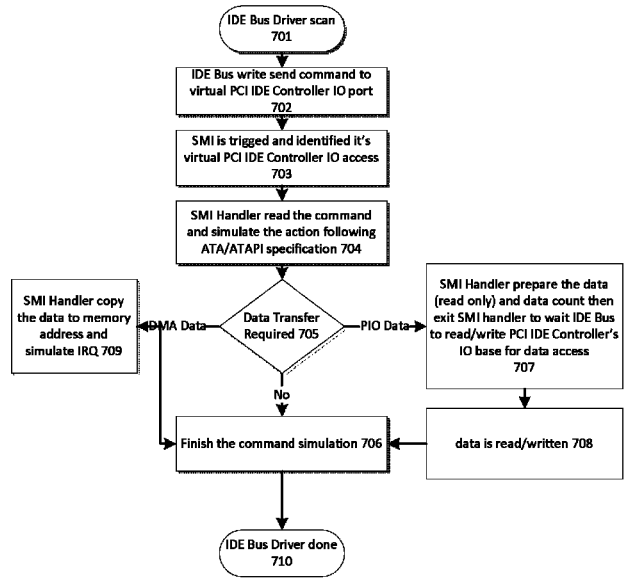
FIG. 7 illustrates a flow chart of a method for simulating an optical disk drive according to an example of the present disclosure.

With reference to FIG. 7 now, FIG. 7 illustrates a flow chart of a method for simulating an optical disk drive after the PCI IDE controller is simulated according to an example of the present disclosure. As shown, the method of FIG. 7 starts at block 701, where the IDE bus driver scans the IDE bus. At block 702, the IDE bus driver sends a command to IO port of the virtual PCI IDE controller, wherein the command can be read, write, closing the ODD, etc. At block 703, the command to the IO port of the virtual PCI IDE controller triggers an SMI and it is identified that this SMI is caused by a virtual PCI IDE controller IO access. At block 704, the SMI handler reads the command and simulates ODD response according to an optical disk drive specification, for example according to the AT Attachment (ATA)/ATA Packet Interface (ATAPI) specification. At block 705, it is determined whether the command requires any data transfer or not (for example, whether it is a read or write operation). If no data transfer is required, the method proceeds to block 706, where the response simulation is finished. If data transfer is required, then the SMI handler performs action according to the type of data transfer. For example, if it is determined that the data transfer is Direct Memory Access (DMA) type, then the method proceeds to block 709, where the SMI handler copies data to the memory address and simulates interrupt request. If it is determined that the data transfer is Programmed Input Output (PIO) type, then the method proceeds to block 707, where the SMI handler prepares the data (read only) and data count and exits the SMI handler to wait for the IDE bus to read PCI IDE controller's IO base for data access, wherein the data count indicates the amount of data to be read. Then at block 708, the data is read or written. From block 709 and block 708, the method proceeds to block 706. Then, the method ends at block 710.

After hardware simulation is ready, the firmware can provide an interface to a user to select the local disk file, remote disk file or remote physical optical device driver. For example, the remote disk file can be accessed through a network such as LAN. The remote access can be based on UEFI (Unified extensible Firmware Interface) Simple Network Protocol and PXE (Pre-boot eXecute Environment) Base code Protocol. The firmware will read the selected source and copy the source content to memory when reading from virtual devices directly before any OS is loaded, after OS loaded an driver/application is necessary to pass the source content to the firmware to avoid firmware and driver to access the disk or network at the same time.

According to another example of the present disclosure, a non-transitory, computer-readable medium is provided. The non-transitory, computer-readable medium can include random access memory (RAM), or non-volatile memory, e.g. any one or more of a read-only memory (ROM), EPROM, EEPROM, etc. The non-transitory, computer-readable medium comprises code configured to direct a processor to: simulate a PCI IDE controller through PCI configuration space IO trap; and simulate a virtual optical disk drive (ODD) through IDE device IO trap. Wherein, said code can be executed during boot time and under the operating system to provide a virtual ODD.

Wherein, the non-transitory, computer-readable medium comprises code configured to simulate a PCI IDE controller by: allocating a PCI address to a virtual PCI IDE controller; allocating memory space to store said virtual PCI IDE controller; enabling IO trap for the PCI configuration space; and loading a PCI bus driver to perform PCI scanning to find said PCI IDE controller.

The non-transitory, computer-readable medium comprises code configured to perform PCI scanning to find said PCI IDE controller by: reading by the PCI bus driver a PCI register of the virtual PCI IDE controller; obtaining by the PCI bus driver a valid PCI register from the PCI address of the virtual PCI IDE device; allocating by the PCI bus driver IO resource and interrupt request (IRQ) to the virtual PCI IDE controller; writing by the PCI bus driver the IO resource to the virtual PCI IDE controller; and storing the IO resource and IRQ and initializing IO trap for the IDE controller's IO space.

The non-transitory, computer-readable medium comprises code configured to simulate the ODD by: sending by an IDE bus driver a command to IO port of the virtual PCI IDE controller; triggering an SMI and identifying that this SMI is caused by access to the IO port of the virtual PCI IDE controller; and reading by an SMI handler the command and simulating ODD response according to the command, wherein said command comprises read, write or closing the ODD and said simulating ODD response is carried out following the ATA/ATAPI specification.

It is to be noted that the above described examples of providing a virtual ODD device both during boot time and under OS can support various optical disks, such as CD-ROM, DVD-ROM, DVD-VIDEO, DVD-R, CD-R/RW, CD-I, VIDEO-CD, CD-G, DVD+RW, DVD-RW. The above examples can help user to reduce extra cost to buy the external optical device and can provide the disk access at any time compared to the current virtual compact disk software.

The figures are only illustrations of an example, wherein the modules or procedure shown in the figures are not necessarily essential for implementing the present disclosure. Moreover, the sequence numbers of the above examples are only for description, and do not indicate an example is more superior to another.

Those skilled in the art can understand that the modules in the device in the example can be arranged in the device in the example as described in the example, or can be alternatively located in one or more devices different from that in the example. The modules in the aforesaid example can be combined into one module or further divided into a plurality of sub-modules.

The invention claimed is:

1. A method for providing a virtual optical disk drive (ODD), comprising:
   simulating a Peripheral Component Interconnect (PCI) Integrated Drive Electronics (IDE) controller through a PCI configuration space Input/Output (I/O) trap to provide a virtual PCI IDE controller; and
   simulating the ODD through an IDE device I/O trap, wherein the simulating the ODD comprises:
      sending, by an IDE bus driver, a command to an I/O port of the virtual PCI IDE controller;
      triggering a system management interrupt (SMI) and identifying that the SMI is caused by an access to the I/O port of the virtual PCI IDE controller; and
      reading, by an SMI handler, the command and simulating an ODD response according to the command.

2. The method of claim 1, wherein the simulating the PCI IDE controller comprises the following operations performed by a system firmware:

allocating a PCI address to the virtual PCI IDE controller;
allocating a memory space to store the virtual PCI IDE controller;
enabling an I/O trap for a PCI configuration space; and
loading a PCI bus driver to perform PCI scanning to find the virtual PCI IDE controller.

3. The method of claim 2, wherein the performing the PCI scanning to find the virtual PCI IDE controller comprises:
reading, by the PCI bus driver, a PCI register of the virtual PCI IDE controller;
obtaining, by the PCI bus driver, a valid PCI register from the PCI address of the virtual PCI IDE controller;
allocating, by the PCI bus driver, an I/O resource and an interrupt request (IRQ) to the virtual PCI IDE controller;
writing, by the PCI bus driver, the I/O resource to the virtual PCI IDE controller; and
storing the I/O resource and the IRQ, and initializing an I/O trap for an I/O space of the virtual PCI IDE controller.

4. The method of claim 1, wherein the command comprises a read of the ODD, a write of the ODD, or closing the ODD.

5. The method of claim 1, wherein the simulating the ODD response is carried out according to an AT Attachment/ATA Packet Interface (ATA/ATAPI) specification.

6. The method of claim 1, wherein when the command is one of read or write, the simulating the ODD response comprises performing a data transfer according to a type of the data transfer, wherein the type of the data transfer comprises a Programmed Input-Output or a Direct Memory Access.

7. The method of claim 1, wherein the simulating the PCI IDE controller and the simulating the ODD are implemented during boot time of a computer.

8. A non-transitory computer-readable medium comprising code that upon execution causes a system to:
simulate a Peripheral Component Interconnect (PCI) Integrated Drive Electronics (IDE) controller, to provide a virtual PCI IDE controller, by using a PCI configuration space Input/Output (I/O) trap that includes triggering a first System Management Interrupt (SMI) in response to an access of a PCI configuration space, and using a first SMI handler to handle the access of the PCI configuration space; and
simulate a virtual optical disk drive (ODD) through an IDE device I/O trap that includes triggering a second SMI in response to an access of the virtual PCI IDE controller, and using a second SMI handler to simulate an ODD response to the access of the virtual PCI IDE controller.

9. The non-transitory computer-readable medium of claim 8, wherein the simulating the PCI IDE controller comprises:
allocating a PCI address to the virtual PCI IDE controller;
allocating a memory space to store the virtual PCI IDE controller;
enabling an I/O trap for the PCI configuration space; and
loading a PCI bus driver to perform PCI scanning to find the virtual PCI IDE controller.

10. The non-transitory computer-readable medium of claim 9, wherein the non-transitory computer-readable medium comprises code configured to perform the PCI scanning to find the virtual PCI IDE controller by:
reading, by the PCI bus driver, a PCI register of the virtual PCI IDE controller;
obtaining, by the PCI bus driver, a valid PCI register from the PCI address of the virtual PCI IDE controller;
allocating, by the PCI bus driver, an I/O resource and an interrupt request (IRQ) to the virtual PCI IDE controller;
writing, by the PCI bus driver, the I/O resource to the virtual PCI IDE controller; and
storing the I/O resource and the IRQ, and initializing an I/O trap for an I/O space of the virtual PCI IDE controller.

11. The non-transitory computer-readable medium of claim 8, wherein the simulating the ODD comprises:
sending, by an IDE bus driver, a command to an I/O port of the virtual PCI IDE controller;
triggering the second SMI and identifying that the second SMI is caused by an access to the I/O port of the virtual PCI IDE controller.

12. The non-transitory computer-readable medium of claim 11, wherein the command comprises a read of the ODD, a write of the ODD, or closing the ODD.

13. The non-transitory computer-readable medium of claim 11, wherein the simulating the ODD response is carried out according to an AT Attachment/ATA Packet Interface (ATA/ATAPI) specification.

14. The non-transitory computer-readable medium of claim 8, wherein the code is executed during boot time of a computer.

15. A system comprising:
a processor; and
a non-transitory storage medium storing instructions executable on the processor to:
simulate a Peripheral Component Interconnect (PCI) Integrated Drive Electronics (IDE) controller through a PCI configuration space Input/Output (I/O) trap to provide a virtual PCI IDE controller; and
simulate the ODD through an IDE device I/O trap, wherein the simulating the ODD comprises:
send, by an IDE bus driver, a command to an I/O port of the virtual PCI IDE controller;
trigger a system management interrupt (SMI) and identifying that the SMI is caused by an access to the I/O port of the virtual PCI IDE controller; and
read, by an SMI handler, the command and simulate an ODD response according to the command.

16. The system of claim 15, wherein the PCI configuration space I/O trap comprises triggering a further SMI in response to an access of a PCI configuration space, and using a further SMI handler to handle the access of the PCI configuration space.

17. The system of claim 16, wherein the triggering of the further SMI is in response to determining that the access of the PCI configuration space is targeted to a virtual PCI device address.

18. The non-transitory computer-readable medium of claim 8, wherein the triggering of the first SMI is in response to determining that the access of the PCI configuration space is targeted to a virtual PCI device address.

* * * * *